United States Patent Office 2,889,089
Patented June 2, 1959

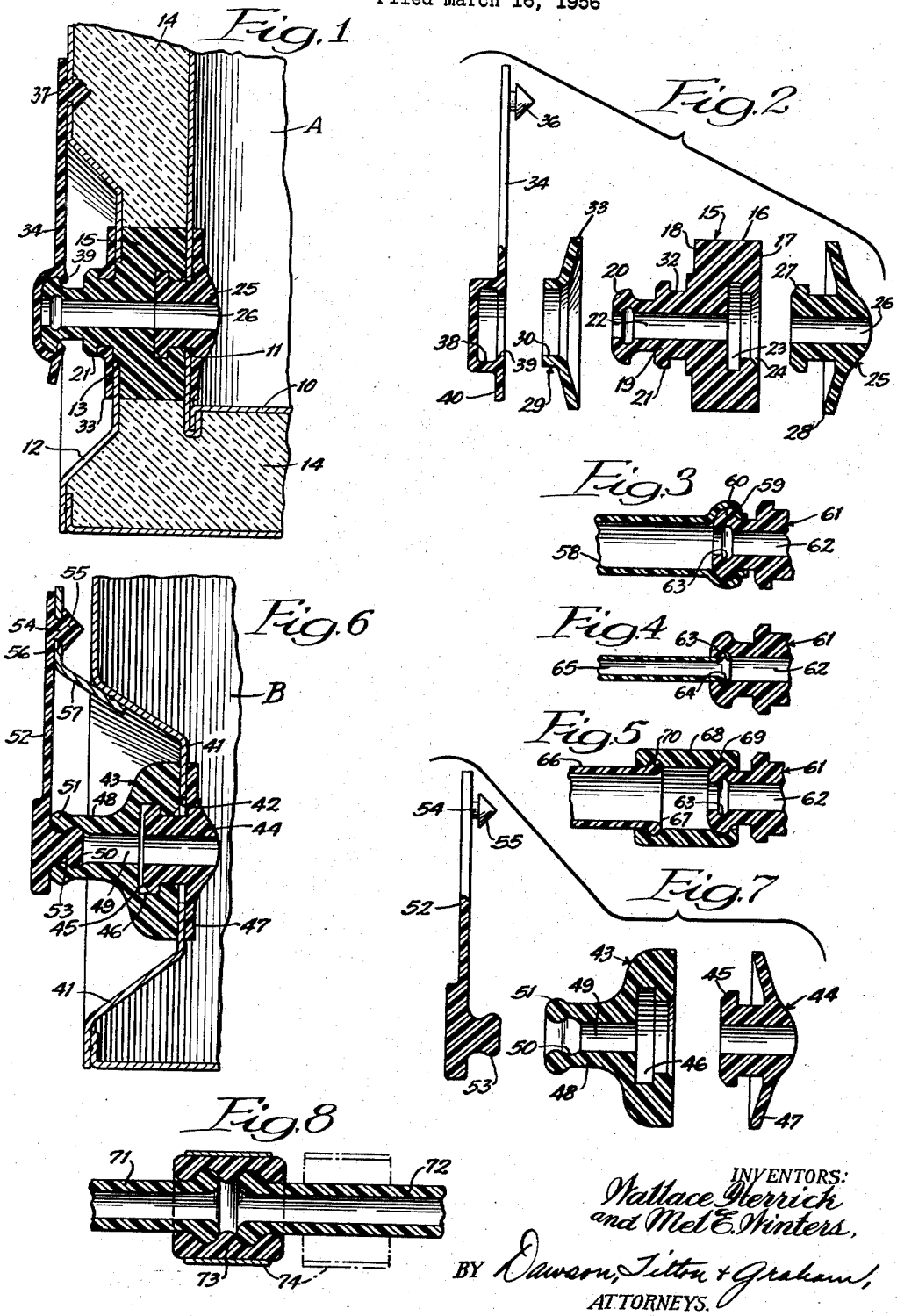

2,889,089

PLASTIC COUPLING STRUCTURES AND DRAIN

Wallace Herrick and Mel E. Winters, Wichita, Kans., assignors to The Coleman Company, Inc., Wichita, Kans., a corporation of Kansas Application March 16, 1956, Serial No. 572,054

7 Claims. (Cl. 222—540)

This invention relates to plastic coupling structures and drain, and more particularly to drain tubes and coupling elements by which the tubes can be connected to containers or other vessels and to each other.

An object of the present invention is to provide fittings which may be readily applied to containers equipped with openings or walls equipped with openings, etc., certain of the elements being resilient so that the fittings can be snapped or pressed into interlocking position for effectively forming seals about the fittings, etc. A further object is to provide a method and means for securing drain fittings within containers or other structures through employing resilient members which snap into interlocking relation and maintain the parts in a sealing relation. A still further object is to provide, in combination with fittings and tubes, coupling means for uniting the tubes or fittings while at the same time providing an effective seal about the connected parts. Yet another object is to provide, in combination with a container equipped with a discharge spout or drain, snap closure means effective for controlling the flow of liquid from the spout or drain, etc. Other specific objects and advantages will appear as the specification proceeds.

The invention is shown, in illustrative embodiments, by the accompanying drawing, in which:

Figure 1 is a broken sectional view of a portion of an insulated container equipped with drain fittings and a closure therefor in accordance with our invention; Fig. 2, a view similar to Fig. 1 but showing the drain fitting and closure elements in spaced-apart relation; Fig. 3, a broken sectional view of a fitting and interlocked tube element; Fig. 4, a view similar to Fig. 3 but showing the tube and fitting interlocked in a different manner; Fig. 5, a broken sectional view showing tube and fitting elements coupled together in accordance with our invention; Fig. 6, a broken sectional view of a container portion equipped with a modified form of drain element embodying our invention and showing a different form of closure; Fig. 7, a view similar to Fig. 6 but showing the closure, drain and fitting elements in spaced-apart relation; and Fig. 8, a sectional view of a modified form of the invention in which a rigid sleeve reinforces the coupling members.

In the illustration given in Figs. 1 and 2, A designates a wall structure which, in the illustration given, is the wall of an insulated container. The container A is provided with an inner liner 10 having an opening 11 extending therethrough. The container A has an outer liner or casing 12 having an opening extending therethrough at 13. Between the liner elements 10 and 12 is insulation 14. Such a structure is useful for the storing or carrying of hot or cold liquids or foods, etc.

We have discovered that a highly effective seal for a drain can be provided, the assembly of the parts being accomplished in a very brief time, through the use of the following structures. A main fitting 15, formed of plastic or other suitable material, is provided with an enlarged body portion 16 having a rear face 17 adapted to receive there-against the liner portion 10 about the opening 11. The opposite side of the body 16 is recessed at 18 to receive similarly a portion of the outer liner 12 adjacent the opening 13. With this structure, the enlarged body flange 16 lies between the liner elements 10 and 12, as shown more clearly in Fig. 1. Integral with the body portion 16 is a forwardly-extending barrel portion 19 having a rounded outer knob portion 20 and an inner bevel flange member 21. The fitting 15 is provided with a longitudinal passage 22 for the flow of liquid through the fitting. At the rear of the fitting is an enlarged radial recess 23 and an enlarged chamber portion 24 communicating with the recess 23.

After the fitting 15 is placed in position, as shown in Fig. 1, with the inner liner 10 abutting the rear face 17 of the body portion 16, we press a lock fitting 25 into the position shown in Fig. 1. The lock fitting 25 has a flow passage 26 therein communicating with the flow passage 22 of fitting 15, and at its inner end the fitting 25 has an outwardly-extending beveled flange 27 adapted to expand into the recess 23 of fitting 15. At the same time, the lock fitting 25 is provided with a flange 28 which normally extends slightly forwardly and is somewhat cup-shaped, and when the lock fitting is pressed into position, as shown in Fig. 1, the flange 28 is straightened and the resilience of the flange holds the same in tight sealing relation against the inner liner 10.

For locking the outer portion of the fitting 15 and sealing the same, we provide an outer lock fitting 29 having an enlarged neck portion 30 adapted to be drawn over the knob 20 and flange 21 of fitting 15 and into interlocking relation with the annular recess 32 of fitting 15. The outer lock fitting 29 is similarly provided with a rearwardly-inclined flange 33 having a dished rear surface, and the same is compressed in the locking of the fitting so as to tightly hug the outer surface of the liner 12 to form a seal therewith. This same structure may be duplicated at the rear face, in place of the structure described above.

To provide a closure for the spout or drain described as above set forth, we employ a sealing cap or flexible strap 34 formed of plastic or like material and having an enlarged locking head 36 adapted to be pressed through an opening 37 of the outer liner or casing 12, as shown more clearly in Fig. 1. The lower portion of the strap is provided with a concavity 38 adapted to engage the knob portion 20 of the fitting 15 to seal the same, and the seal is further insured by providing the concave portion 38 with an inwardly-extending annular lip 39. A depending handle portion 40 connected to the lip portion 39 is effective for lowering the lip and drawing the same to permit removal of the strap 34 from the drain fitting outlet.

In the foregoing structure as set out in Figs. 1 and 2, the inner or main fitting 15 may be formed of rigid molded material or of flexible material, if desired. We prefer to form the locking fittings 25 and 29 of plastic material such as polyethylene, nylon, polystyrene, and the like. Plastics having a memory, or the property of permitting distortion and then recovering their shape, are well known in the art and for the purposes of the present invention the shape-recovering plastics may be either of the slow recovery type or of the rapid recovery type. Resins or plastics of this character permit the locking elements to be distorted to bring them into the position shown in Fig. 1, and when in such positions, the interlocking flanges form a tight union with the recesses in the main fitting 15 and are effective in forming a tight seal between the container liners or casing members and the main fitting. Further, the assembly of the parts can be accomplished in a minimum of time by merely pressing the parts together in the relation shown.

In the illustration given in Figs. 6 and 7, the drain and lock fittings are shown employed with a container B having a single wall 41 adjacent the opening 42. A main fitting 43 has a rear face abutting the container wall 41, and a resilient plastic lock fitting 44 is equipped with a flange 45 engaging the radial recess 46 of the main fitting 41. The locking member 44 has a forwardly-extending annular flange 47 which is dished and which tends to grip the wall 41 when the parts are brought into assembled relation as shown in Fig. 6. The fitting 43 is provided with a forwardly-extending spout portion 48 having a passage 49 extending therethrough and enlarged at 50. Forwardly of the recess 50 is an enlarged bead portion 51. A flexible strap 52 may be provided at its lower end with an inwardly-projecting knob or ball portion 53 adapted to engage the recess 50 to form a seal therewith. The strap is provided at its upper end with a neck 54 and head 55 engageable with a recess 56 in an attachment flange 57 for securing the strap to the container B. If desired, the strap portion may be omitted.

The structure shown in Figs. 6 and 7 is very similar to that shown in Fig. 1, except that a different closure member is employed, and also the outer locking fitting is omitted in this structure.

The coupling elements and fittings heretofore described may also be used in other arrangements, as for coupling tubes, etc. In the illustration given in Fig. 3, a tube 58 is provided at its end with an annular groove 59 adapted to receive the head portion 60 of the fitting 61. The fitting 61, as shown also in Fig. 3, is provided with a flow passage 62 and an enlarged radial annular recess 63 at its forward end adapted to receive the head 64 of a tube 65. The resilience of the tube or fitting enables the parts to be connected as illustrated in Figs. 3 and 4. The fitting 61 may also be connected to a tube 66 having a beaded end 67 by means of a coupling sleeve 68 having annular inner recesses 69 and 70, as shown more clearly in in Fig. 5. In all of the parts described, at least one of the interlocking members or coupled elements must be resilient or shape-recoverable so that after the forming of the interlock between the parts, the plastic flange, etc. recovers its shape to form the necessary interlock.

Not only are the plastic members having the property of shape recovery suitable for the rapid coupling or uniting of parts, but also they form a tight seal when the parts are united, whereby liquid and other fluid can be effectively carried through the joined parts without leakage.

In Figs. 1 and 6, the drain spout has been shown extending within a recess formed in the outer casing liner and near the bottom of the container. It will be understood that the drain may be formed, with or without such recess in the top wall of the container or in the bottom wall as well as in the side wall as described. Further, the interlock between the fittings may be provided by beads or flanges on one of the fittings and cooperating internal grooves or recesses or external grooves or recesses in the other fitting. In the structure, however, we find that after the parts have been pressed together in interlocking relation, the parts maintain the sealing flanges which extend around the opening and in contact with the container or wall liners so as to form a tight and effective seal therewith.

In the structure shown in Fig. 8, the tubes 71 and 72 equipped with beads at their ends are connected by a flexible tube formed of plastic, rubber, etc., the resilient tube receiving and interlocking with the beads of the members 71 and 72. Under pressure, however, such a flexible tube 73 would yield, and, in order to maintain an effective connection, we provide a rigid tube 74 formed of metal, rigid plastic, or any other suitable material capable of withstanding pressure, and this is pressed over the flexible member 73 to reinforce it and to maintain it in position against pressures existing within the tubes 71 and 72.

While, in the foregoing specification, we have set forth a specific structure in considerable detail for the purpose of illustrating the invention, it will be understood that such details of structure may be varied widely by those skilled in the art without departing from the spirit of our invention.

We claim:

1. In combination with a wall provided with an opening therethrough, a main fitting providing a flow passage and having a side engaging said wall about said opening, a resilient lock fitting having a cup-shaped outwardly-extending flange adapted to be compressed into sealing engagement with said wall about said opening, said lock fitting and said main fitting being provided with complementary flange and recess members providing an interlock between the fittings when the fittings are pressed together, said main fitting, at the side opposite said first-mentioned side, providing a drain spout extending from said wall, and a flexible cap having a resilient annular seal which engages the end of said spout for sealing the same.

2. The structure of claim 1, in which the cap is carried by a strap anchored to the container wall having an opening therethrough, the strap having a neck portion extending through the opening and an enlarged head integral with said neck and engaging the inner surface of the wall.

3. In combination with a barrier provided by spaced-apart walls and having an opening extending therethrough, a main fitting having a flow passage therethrough communicating with said opening and having opposite ends abutting said walls about the opening through said barrier, a pair of lock fittings having parts resiliently interlocking with the main fitting on opposite sides of the walls and equipped with cup-shaped flanges engaging the respective walls to seal the same about said main fitting, and a cap carried by a strap anchored to one of said walls and adapted to sealingly close said flow passage.

4. In combination with a wall provided with an opening therethrough, a main fitting providing a flow passage aligned with said opening and having a side engaging said wall about said opening, a resilient lock fitting having a generally cup-shaped, outwardly extending, beveled flange adapted to be compressed into sealing engagement with the wall above said opening, said lock fitting having a passage extending therethrough aligned with said opening and flow passage, said main fitting being equipped with a recess spaced from the wall-engaging side, a recess-engaging portion on said lock fitting spaced from said flange, the spaces provided being so related as to compress said flange into sealing relation with one side of said wall when the wall-engaging side of said main fitting abuts the other side of said wall and said recess-engaging portion is mounted within said recess, said recess and said recess-engaging portion being equipped with abutting walls generally perpendicular to said flow passage.

5. In combination with a wall provided with an opening therethrough, a main fitting providing a flow passage aligned with said opening and having a side engaging the wall about said opening, a resilient lock fitting having a generally cup-shaped, outwardly extending flange adapted to be compressed into sealing engagement with said wall above said opening, said lock fitting having a passage extending therethrough aligned with said opening and flow passage, said flange being beveled relative to said lock fitting passage, said lock fitting being equipped with a wall portion perpendicular to the passage thereof and remote from said flange, said main fitting being equipped with a recess-providing wall portion perpendicular to said flow passage and remote from said wall-engaging side, said wall portions being in abutting relation and so spaced relative to said flange and wall-engaging side as to compress said flange into sealing engagement with one side of said wall when the said wall-engaging side of said main fitting abuts the other side of said wall.

6. The combination of claim 5 in which openable closure means are provided for the said flow passage of said main fitting.

7. In combination with a wall provided with an opening therethrough, a main fitting providing a flow passage and having a side engaging said wall above said opening, a resilient lock fitting having a central passage and a cup-shaped, outwardly extending beveled flange adapted to be compressed into sealing engagement with said wall above said opening, said main fitting being equipped with an annular recess equipped with a wall portion perpendicular to the flow passage thereof remote from said wall-engaging side, said lock fitting being equipped with a wall portion perpendicular to said passage and remote from said flange, the last-mentioned wall portion mating with the first-mentioned wall portion to compress said flange, and openable closure means for said flow passage.

References Cited in the file of this patent

UNITED STATES PATENTS

| | | |
|---|---|---|
| 980,355 | Spencer | Jan. 3, 1911 |
| 1,867,430 | Wisner | July 12, 1932 |
| 1,892,788 | Schwartz | Jan. 3, 1933 |
| 2,690,861 | Tupper | Oct. 5, 1954 |
| 2,748,984 | Seymour | June 5, 1956 |
| 2,751,131 | Nyden | June 19, 1956 |